United States Patent
Gresset et al.

(10) Patent No.: US 12,294,420 B2
(45) Date of Patent: May 6, 2025

(54) METHOD, COMPUTER PROGRAM, DEVICE AND RADIOFREQUENCY SYSTEM FOR ESTIMATING INTERFERENCE ON A RADIOFREQUENCY SYSTEM USING A SET OF CHANNELS

(71) Applicant: MITSUBISHI ELECTRIC CORPORATION, Tokyo (JP)

(72) Inventors: Nicolas Gresset, Rennes (FR); Viet-Hoa Nguyen, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 300 days.

(21) Appl. No.: 18/023,111

(22) PCT Filed: Sep. 16, 2020

(86) PCT No.: PCT/JP2020/036498
§ 371 (c)(1),
(2) Date: Feb. 24, 2023

(87) PCT Pub. No.: WO2022/059215
PCT Pub. Date: Mar. 24, 2022

(65) Prior Publication Data
US 2023/0308197 A1  Sep. 28, 2023

(51) Int. Cl.
*H04B 17/336* (2015.01)
*H04L 5/00* (2006.01)
*H04W 74/0816* (2024.01)

(52) U.S. Cl.
CPC ......... *H04B 17/336* (2015.01); *H04L 5/0012* (2013.01); *H04W 74/0816* (2013.01)

(58) Field of Classification Search
CPC ........................... H04B 17/336; H04L 5/0012
See application file for complete search history.

(56) References Cited

U.S. PATENT DOCUMENTS

2015/0207483 A1   7/2015  Lin et al.
2020/0389205 A1*  12/2020  Gresset ................. H04B 1/715

FOREIGN PATENT DOCUMENTS

EP          3 522 404 A1      8/2019

OTHER PUBLICATIONS

Ghosh et al., "Markov Chain Existence and Hidden Markov Models in Spectrum Sensing", Pervasive Computing and Communications, 2009, PERCOM 2009, IEEE International Conference on, IEEE, Piscataway, NJ, USA, Mar. 9, 2009, pp. 1-6.

(Continued)

*Primary Examiner* — Zhiren Qin
(74) *Attorney, Agent, or Firm* — Birch, Stewart, Kolasch & Birch, LLP

(57) ABSTRACT

A method includes: determining a set of all possible configurations of occupation or non-occupation of a set of transmission bands, defined as a set of possible vectors; building a matrix from a stacking of all the possible vectors; obtaining measurements of occupation of at least a part of the set of channels, at respective time instants; and computing probabilities using a channel transition function so as to determine, for each transmission band, an estimated activation rate, on the basis of the measurements. The estimated activation rate corresponds to an occupation rate of a transmission band by an interferer within the given observation time window, and the probabilities computations include an iterative resolution of a non-linear optimization problem with a constraint derived from the Gibbs' inequality.

12 Claims, 3 Drawing Sheets

(56) References Cited

OTHER PUBLICATIONS

Indian Office Action for Indian Application No. 202347013101, dated Feb. 19, 2024, with English translation.

* cited by examiner

METHOD, COMPUTER PROGRAM, DEVICE AND RADIOFREQUENCY SYSTEM FOR ESTIMATING INTERFERENCE ON A RADIOFREQUENCY SYSTEM USING A SET OF CHANNELS

TECHNICAL FIELD

The invention relates to systems which may use given radiofrequency channels, such as for example frequency hopping in ISM public bands (ISM for "Industrial, Scientific and Medical Radio Band"), and may be then subject to interference from other devices such as WiFi devices for example.

BACKGROUND ART

Examples of such systems possibly suffering from interferers can be for example a computer communicating device of an autonomous car, or, as another example, a communication-based train control having a radio technology communication device.

Interference issues could lead to severe problems in these autonomous vehicle applications.

Interference avoidance technologies based on cognitive radio could be further developed. For example, at each vehicle travel, measurements on the neighbouring interference can be fed back from the vehicle to a server along with the vehicle position. At the server, a database can be built to gather the measurements belonging to clusters of positions and frequency channels in a statistical function (for usual vehicle paths typically). Examples of such an implementation type are described for example in documents WO-2017/122548 and WO-2017/122549.

This knowledge can be thus used for performing radio resource management and monitoring of the radio system. In the context of vehicle radio monitoring, an identification method can be implemented typically to decide whether a WiFi device is responsible of a problem occurring at the radio level or not. However a drawback of that approach is that many measurements are needed to feed the database with. Signal analysis and recognition are well investigated topics. In general, a device would be specifically designed so as to provide the best detection performance, but in the background of the invention hereafter, the communicating system may be constrained by its own radio design.

As for an example of implementation performed by the Applicant which is a system for Communication-Based Train Control (CBTC), such a system uses ISM band to establish the connection between trains and waysides. However, this (public) band is also widely used by many others devices (WiFi, Bluetooth, etc.) that can cause interference to CBTC signal. In document EP-18305112, a method that is capable to identify the activation rate of interference in each WiFi channel is proposed. This information is necessary in the feedback link that helps the server gathering enough knowledge to carry out efficient resource management or radio condition monitoring.

More precisely, with measurements of power on a frequency band smaller than the one of the Wifi signal, there is no known approach except the one proposed in document EP-18305112 for determining the statistical occupation rate by one or several interferers in some a priori unknown transmission bands among the total number of WiFi transmission bands. One difficulty is the discrimination of interferers since these interferers can have an influence and be active in other transmission bands as well.

FIG. 5 shows the problem solved in document EP-18305112. The radiofrequency system provides a set of channels (from 1 to 16 in the example shown on FIG. 5). The index of the channels is labelled CHi. For example, each of these channels can have a bandwidth of 5 MHz.

An interfering radiofrequency system (such as Wifi system for example) can have one or several interferers, each of these interferers being susceptible to be active on a transmission band which is constituted by several contiguous channels. In the example of FIG. 5, the interfering system can have from 1 to 13 transmission bands, having an index labelled "TBi" in FIG. 5.

More particularly, in the example of FIG. 5, each transmission band TBi has a bandwidth of 20 MHz and:
TB1 extends on four contiguous channels 1 to 4,
TB2 extends on four contiguous channels 2 to 5,
TB3 extends on four contiguous channels 3 to 6,
Etc.
TB13 extends on four contiguous channels: 13, 14, 15, 16.

It is worth noticing here that the index TBi has the same value than the first channel CHi of the contiguous channels. This index is therefore simply labelled "i" in the following description, and is assigned to an interferer index (from 1 to I, with I=13 in the example of FIG. 5).

It is worth also noticing here that two interferers can be active for example on two consecutive transmission bands overlapping on three channels. Moreover, an interferer can be active from time to time and not permanently.

A difficulty solved in document EP-18305112 was then to discriminate on which transmission band an interferer is finally active within a given time window frame, and give typically an activation rate of that interferer in a corresponding transmission band within that time window.

In order to estimate the activation rate of interference in each WiFi channel, document EP-18305112 was based on a knowledge of the interference structure resulting from CSMA/CA protocol when no contention occurs. Then, an Expectation-Maximization algorithm was performed to solve the estimation problem. The maximization step of the algorithm involves computing a solution of an under-determined system. This problem was solved by using a simple approximation. However, this approximation might in some cases lead to sub-optimality.

Typically, it is sought for an improvement of the solution proposed in document EP-18305112 to lead to a faster convergence and better accuracy of the activation rate estimation.

Moreover, document EP-18305112 proposed to build a set $\Omega$ of all N possible configurations of occupation or non-occupation of transmission bands, satisfying a non-overlapping condition. This non-overlapping condition corresponds to the fact that only one interferer i, among a set of I possible interferers, can be active at a same time k on each channel, this channel forming, with contiguous channels, a transmission band i as shown in FIG. 5.

This set $\Omega$ of all N possible configurations is shown in FIG. 2 and explained in further details below as related still to a possible embodiment of the invention.

This non-overlapping condition was a constraint added in order to solve in an easier way the problem with the method proposed in document EP-18305112.

However, in very seldom but possible cases, overlapping can happen in systems of the CBTC's kind. Indeed in a case of a so-called "hidden node", such a node can be in the middle of two interferers "hear" then two overlapped interferers.

SUMMARY OF INVENTION

The invention aims to improve the situation.

To that end, the invention proposes a method implemented by computer means for estimating interference on a radiofrequency system using a set of channels, said interference being caused by interferers of an interfering system using a set of transmission bands, each of said transmission band extending on a plurality of contiguous channels of said set of channels.

The method comprises:

Determining a set $\Omega$ of all N possible configurations of occupation or non-occupation of said set of transmission bands, defined as a set of possible vectors $Z_k = [Z_{1,k}, \ldots, Z_{i,k}, \ldots Z_{I,k}]$, Building a matrix A from a stacking of all the possible vectors $Z_k$, Obtaining measurements $X_1, \ldots, X_k, \ldots, X_K$ of occupation of at least a part of said set of channels, at respective time instants k: $0 < k \leq K$, where K defines a given observation time window, Computing probabilities defined as: $\forall k, \forall z_j \in \Omega$, $P(X_k|Z_k=Z_j)$, where $P(X|Z)$ defines a channel transition function, so as to determine, for each transmission band, an estimated activation rate $\tau$, on the basis of said measurements $X_1, \ldots, X_k, \ldots, X_K$, said estimated activation rate $\tau$ corresponding to an occupation rate of a transmission band i by an interferer within said given observation time window.

More particularly said probabilities computations iteratively comprise, at each iteration t:

resolving a non-linear optimization problem with a constraint defined so as to:

maximize $$\sum_k \sum_{j=1}^{N} \frac{P(X_k|Z_k = z_j)\theta_j}{\sum_{l=1}^{N} P(X_k|Z_k = z_l)\theta_l} \quad (1)$$

$$\log\left(\frac{1}{K}\sum_{k'} \frac{P(X_{k'}|Z_{k'} = z_j)}{\sum_{l=1}^{N} P(X_{k'}|Z_{k'} = z_l)\theta_l}\right)$$

subject to $$\sum_{j=1}^{N} \theta_j = 1$$

$$A\theta = \tau^{(t)}$$

$$\forall j, 0 \leq \theta_j \leq 1$$

where vector $\tau^{(t)}$ is a column of activation rates in respective transmission bands i estimated at an iteration index t, and vector $\theta$ is a hidden variable, computing a vector $\varphi = [\varphi_1, \ldots, \varphi_N]$ as a hidden variable such as:

$$\varphi_j = \frac{1}{K}\sum_k \frac{P(X_k|Z_k = z_j)\theta_j}{\sum_{l=1}^{N} P(X_k|Z_k = z_l)\theta_l} \quad (2)$$

and updating the vector of the activation rates for a next iteration index t+1, as $$\tau^{(t+1)} = A\varphi.$$

More particularly, the constraint expressed above (1) can derive from the Gibbs' inequality statement about the mathematical entropy of a discrete probability distribution (i.e. the information entropy is less than or equal to its cross entropy with any other distribution, as applied in the detailed description below).

In a non-limitative example of embodiment, the possible vectors $Z_k = [Z_{1,k}, \ldots, Z_{i,k}, \ldots Z_{I,k}]$ of the set $\Omega$ satisfy at a time instant k a non-overlapping condition of said radiofrequency system, said non-overlapping condition corresponding to the fact that only one interferer i, among a set of I possible interferers, can be active at a same time k on each channel of said set of channels and forming, with contiguous channels, a transmission band i.

In an example of embodiment further, said non-overlapping condition can derive from a multiple access implementation (CSMA/CA or CSMA/CD) performed by said radiofrequency system, said multiple access implementation defining communication timeslots, and said measurements $X_k$ being collected at each timeslot k.

However, in a general embodiment where the aforesaid non-overlapping condition might not apply, the set $\Omega$ of possible vectors can comprise up to 2' elements (I being the total number of considered transmission bands), as explained in details in the description below.

In an embodiment where said communicating system implements a frequency hopping on said channels, said step of obtaining measurements $X_1, \ldots, X_k, \ldots, X_K$ is performed according to a frequency hopping implementation.

In a possible embodiment detailed hereafter as an example, a number of said contiguous channels forming a transmission band is four, a total number of channels of said set of channels being sixteen.

In that example of embodiment, each of said channels extends over 5 MHz, whereas each of said transmission bands extends over 20 MHz with a spread spectrum technology implementation.

This example of embodiment can typically correspond to an implementation where said radiofrequency system corresponds to an ISM type communication system, while the interfering system corresponds to a Wifi type communication system.

The method can further include a selection step for communication of at least one channel among said set of channels, said selected channel being within a transmission band for which said estimated activation rate $\tau$ is the lowest.

The invention aims also at a computer program comprising instructions for performing the method presented above, when these instructions are run by a processor. Examples of general algorithms of such a computer programs are shown of FIG. 3 detailed below.

The invention aims also at a device for estimating interference on a radiofrequency system using a set of channels, said interference being caused by interferers of an interfering system using a set of transmission bands, each of said transmission band extending on a plurality of contiguous channels of said set of channels. More particularly, the device comprises a processing circuit for performing the method above, as shown in the example of FIG. 4 commented below.

The invention aims also at a radiofrequency communication system, comprising such a device for estimating interference susceptible to occur on channels to be used by the radiofrequency communication system.

The present invention is illustrated by way of example, and not by way of limitation, in the figures of the accompanying drawings, in which, further than FIG. 5 commented above.

DESCRIPTION OF EMBODIMENT

A problem solved by the invention is the classification of interference (Wifi or not) according to measurements performed by a radio system. In the example disclosed hereafter, the radiofrequency system in stake has the following properties:

Frequency hopping on channels of 5 MHz band at a rate around 4 ms
Packets of 1.5 ms
Within each slot of 4 ms, CSMA/CA or CSMA/CD multiple access (two transmission attempts)
Measurements collected at each time slot
The WiFi system properties are
Spread spectrum technology on 20 MHz transmission bands
WiFi PHY layer packet of 200 µs in general (including acknowledgements ACK)
Transmission frame duration of around 100 ms in average (packet at transport layer)
CSMA/CA multiple access It is therefore assumed in the present example of implementation that each current transmission band of the interfering system is to be considered with an observation on bands of 5 MHz among the sixteen channels of the radio system. Each current transmission band extends on a total band of 20 MHz according to the WiFi system properties, which corresponds here to four contiguous channels of the radio system. Of course, the numbers of 16 channels and 4 contiguous channels are examples given here and may admit variants. Also, the transmission bands (also called "W-channels" hereafter) can be overlapping, producing thus a total of 13 transmission bands. By indexing the channels which are 5 MHz wide from 1 to 16, the transmission bands are defined by the aggregations of channels with indexes:

[1 2 3 4], [2 3 4 5], . . . , [12 13 14 15], [13 14 15 16].

Figure 1:
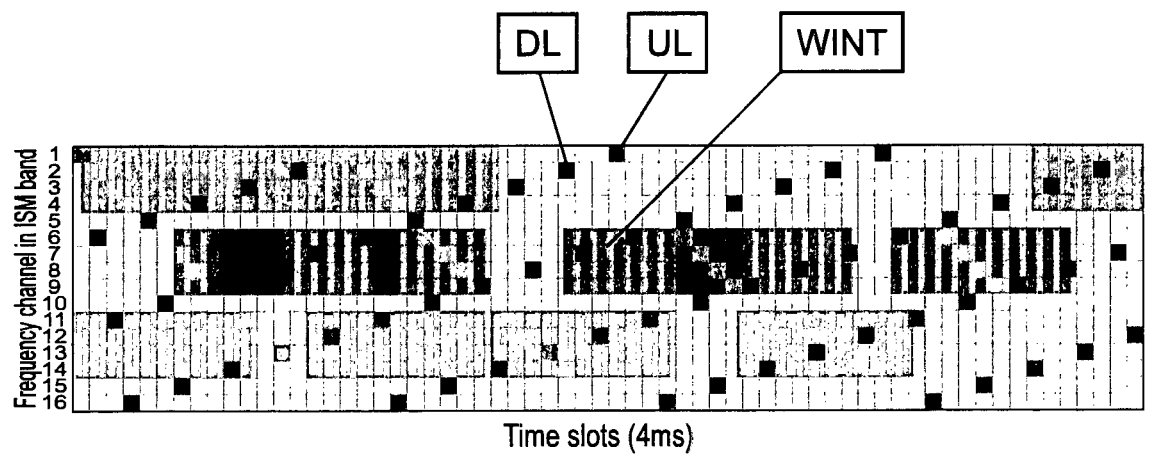
FIG. 1 shows schematically the frequency hopping communication scheme DL, UL implemented by the radiofrequency communication system according to the invention, compared to the noise scheme WINT due to interferers in a subset of contiguous channels (here four channels), this subset being constant over time (over at least several successive timeslots) and defining a transmission band of the interfering system.

The system is able to detect neighbouring interferers and try another connection in case of collision detection. It is worth to add that these interferers are not impacted generally by the current radio system which usually uses directional antennas at the transmitter. The interferers are not deemed to be active according to a frequency hopping scheme but rather to be active on a fixed subset of several channels as shown in FIG. 1 commented below. However, in the embodiment presented here after (even if the invention can be implemented without the so-called "non-overlapping condition"), it is still deemed that the interferers usually respect a non-overlapping condition according to which two interferers cannot overlap on a same channel at a same time, as a result of the CSMA/CA multiple access scheme. These observations explain the general wordings that:

each of the interferers is susceptible to be active on a transmission band formed by a plurality of contiguous channels of the whole set of channels, in particular at respective time instants k, and only one interferer can be active on each transmission band at a same time k, and for example when two transmission bands (having a width of 20 MHz) are overlapping on one or several channels (from one to three channels, each having a width of 5 MHz), an additional condition is that only one interferer can be active on each channel at a same time k.

In order to distinguish hereafter the transmission bands of the interfering system (for example WiFi) and the channels of the communicating system (for example ISM), the transmission bands are called "W-channel" hereafter, while the "channels" remain the channels of the communicating system.

An illustration of the coexistence of the radio system packets (uplink UL and downlink DL) and WiFi interference (WINT) is shown in FIG. 1, where the frequency/time usage of the ISM band is illustrated. Within the WiFi interference zones, the time occupancy slices into small PHY WiFi packets with collision avoidance mechanisms. Roughly a half of the frequency hops are used for downlink and the other half for uplink. Thus, by configuring a given observation time window, the number of interference measurements on each channel might be different. Some channels might even not have any measurement opportunity within that time window.

Hereafter, the following notations are used:

k is a time instant, i.e. a hop of the current radio system. More precisely, a time window of K time instants is considered.

$X_k$ is an interference observation, over one channel in the present example of embodiment, at time instant k: $0<k\leq K$. Each $X_k$ can correspond to a power measurement or of a signal to noise ratio, sounded in each channel, or to a simulation according to a given scheme.

$f_k$ is the index of the frequency channel sounded at time instant k.

$Z_{i,k}$ is a random variable stating if interference is active on the i-th W-channel (out of I) at a time instant k.

In the embodiment presented here as a non limitative example, as a result of the CSMA/CA multiple access scheme, two interferers cannot overlap at the same time, which can be mathematically written as:

$$Z_{i,k}=1 \Rightarrow \forall j \neq i / i-3 \leq j \leq i+3, Z_{j,k}=0$$

The random variables are independent in time, i.e., $$\forall i, \forall (k,k'), k \neq k', E[Z_{i,k} Z_{i,k'}]=0$$

Where E[.] denotes the mathematical expectation. When this expectation must be performed on a finite set of values, the expectation is replaced and approximated by an arithmetic mean.

Since the non-overlapping condition is still applied hereafter, it is still considered at first a set $\Omega$ defined as a set of possible vectors $Z_k=[Z_{1,k} \ldots Z_{I,k}]$ satisfying at a time instant k this non-overlapping condition.

Figure 2:
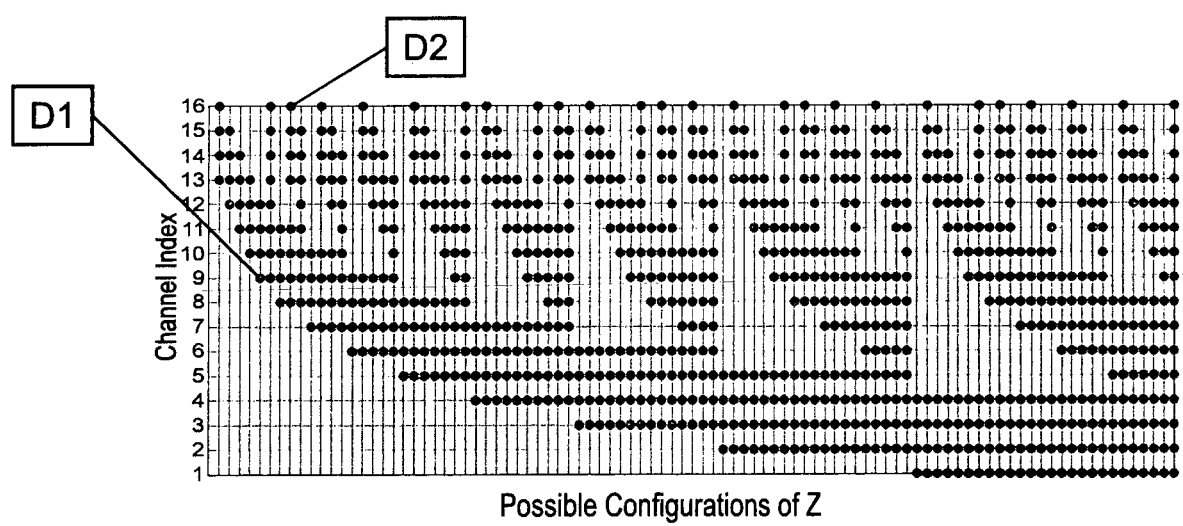
FIG. 2 shows all the N possible configurations of the set $\Omega$ of occupation of interferers or non-occupation of the channels of the whole set of channels.

FIG. 2 illustrates by dots D1 (light grey) the set $\Omega$ over 16 channels of 5 MHz in the ISM band of 80 MHz. One dot D1 illustrates then the starting index i of a W-channel, and three dots D2 (black dots, above and beneath a dot D1, when possible) illustrate the channels indexes i+1, i+2 and i+3 also allocated to the WiFi interferer with 20 MHz-wide band for the associated W-channel composed of the four channels i, i+1, i+2, i+3.

For example, when taking a channel index 9 having a D1 dot at the first third of the X-axis (one abscissa representing one possible configuration for a vector Z in the set $\Omega$), the W-channel 9 is composed of the channels 9, 10, 11, 12. The D1 dot indicates that the channel 9 is the index used to identify this 20 MHz-wide W-channel. It can be observed that, because two W-channels cannot overlap at the same time, only the W-channels starting at index 13, 5, 4, 3, 2, 1 can coexist at the same time of the W-channel starting at index 9. According to another example of FIG. 2 corresponding to another possibility of the set $\Omega$, the configuration with W-channels starting at index 1, 5, 9, 13 with four interferers all active at the same time is possible and shown as the last configuration on the right end of FIG. 2.

It can be observed that N=95 allocations with at least one interferer and satisfying the CSMA/CA non-overlapping properties between interferers are possible (95 abscissa along the X-axis).

Figure 5:
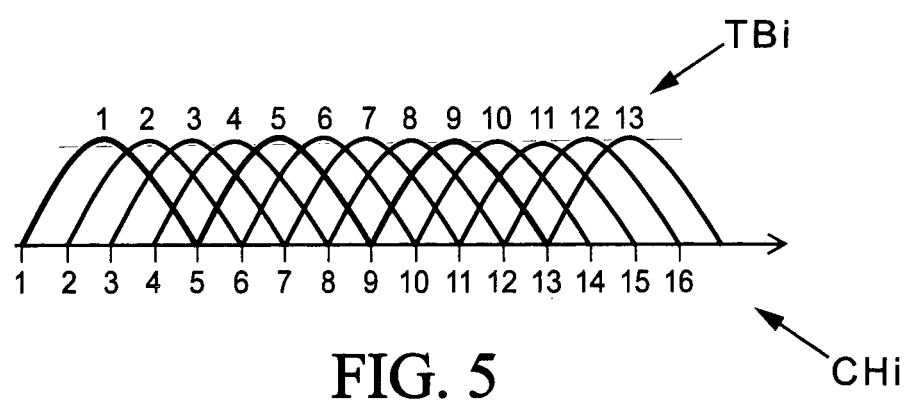
FIG. 5 shows schematically an example of a radiofrequency system providing a set of channels in document EP-18305112.

This set $\Omega$, having a limited number of N possible configurations in the present embodiment thanks to respect of the non-overlapping condition, can, in a general way, simply have a number of elements corresponding to $N=2^I$ where I is the number of transmission bands and for example I=13 in FIGS. 1 and 5. This generalization makes it possible to take into account overlapping cases such as hidden nodes between two interferers. The algorithm of the present invention makes it possible to implement such a generalization, thanks to the fast convergence of the method described now below.

Hereafter, the notation $\Omega$ can aim at the set presented above when referring to FIG. 2, or in a general case can aim at set having $2^I$ possible vectors.

One notation which is used also below is:

$\tau_i$, being the activation rate of the i-th interferer, i.e.
$\tau_i = E_k[Z_{i,k}]$ where $E_k[.]$ denotes the mathematical expectation over the different time instant. When this expectation must be performed on a finite set of values, i.e., when considering a finite time window, the expectation is replaced and approximated by an arithmetic mean.

The problem to solve is the computation of the set T from the vector of observations $X=[X_1, \ldots, X_K]$.

The maximum a posteriori: $\hat{\tau} = \underset{\tau}{\arg\max} P(\tau|X)$ can be converted into a maximum likelihood problem by considering that all the variables $\tau$ are equiprobable a priori: $\hat{\tau} = \underset{\tau}{\arg\max} P(X|\tau)$ This involves that before receiving any observation, there is no information to say that one of the activation rates $\tau_i$ for the i-th W-channel is higher than another.

Furthermore, the latent variables Z are also equiprobable a priori such that:

$\hat{\tau} = \underset{\tau}{\arg\max} \Sigma_{Z \in \Omega} P(X,Z|\tau)$ which gives a new optimization problem to solve.

The problem $\hat{\tau} = \underset{\tau}{\arg\max} \Sigma_{Z \in \Omega} P(X, Z|\tau)$ is intractable because of the high dimensionality of the set of possible vectors $Z(\in \Omega)$ and $\tau$. Thus, an expectation-maximum approach which iteratively approximated the maximum likelihood solution was used in document EP-18305112.

The goal of the present invention is still to estimate the expectation of random vectors Z from the observations $\{X_k\}$ at the output of a channel defined by its transition probability $P(X|Z)$, where realizations $\{Z_k\}$ of Z belong to a known and finite set $\Omega$ (which can be represented below by a matrix A when stacking all its elements row-wise).

Figure 3:
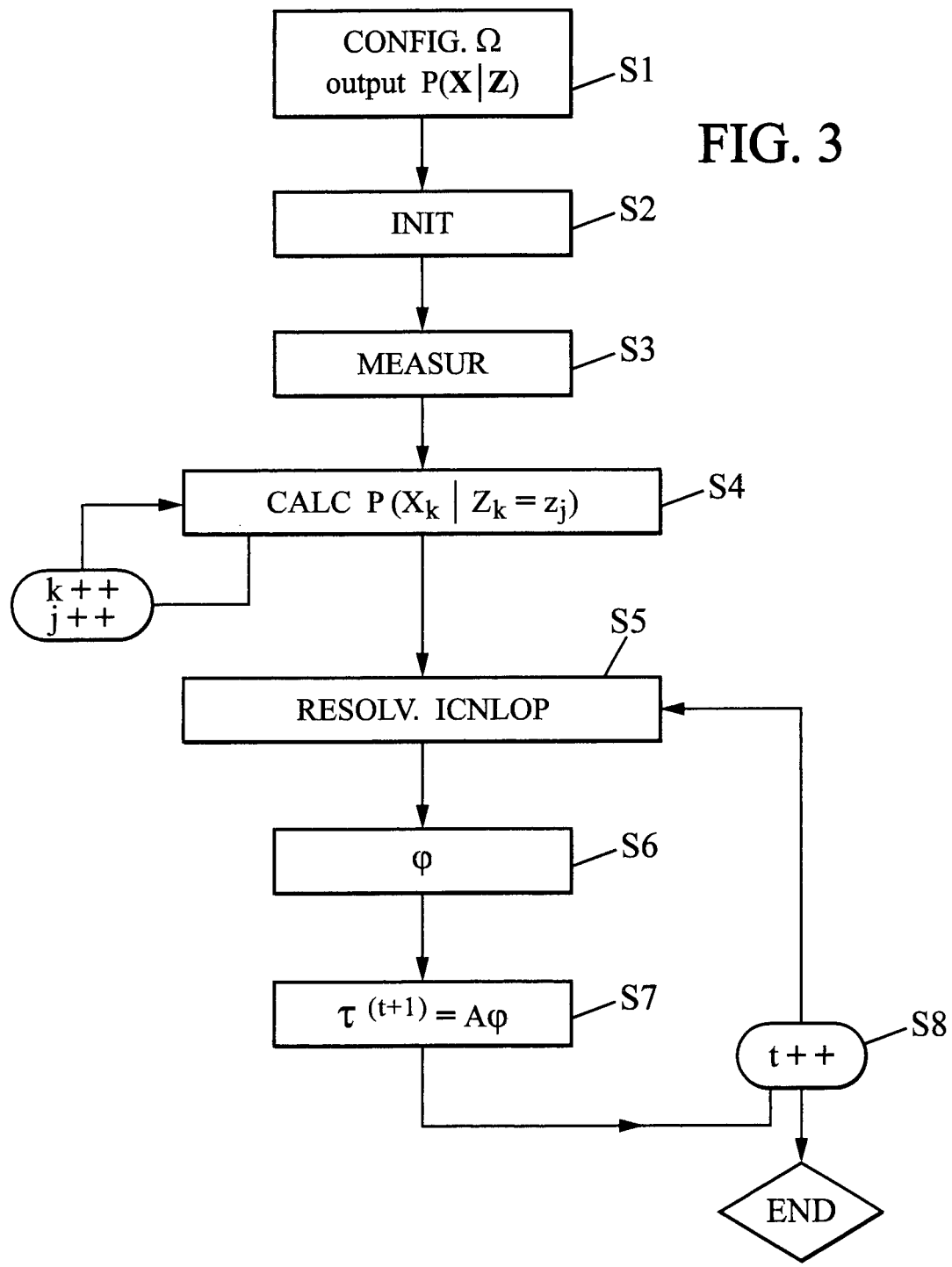
FIG. 3 shows an example of the main steps of a method according to the invention.

Referring to FIG. 3, the invention, in a possible embodiment, can comprise the steps of:

in step S1, determining the set $\Omega$ of possible configurations (possibly $2^I$), and more particularly:
   obtaining a matrix A stacking the possible configurations of a random vector Z,
   defining a channel transition function noted as introduced above: $P(X|Z)$.

in step S2, initializing $\tau^{(1)}$ with zero values and set t as t=1; where t represents an iteration index in the following iterative processing.

in step S3, collecting measurements $X_1, \ldots, X_K$, in step S4, computing the probabilities: $\forall k, \forall z_j \in \Omega, P(X_k|Z_k=z_j)$ in step S5, resolve an inequality constraint non-linear optimization problem (ICNLOP), such as:

maximize $$\sum_{k}\sum_{j=1}^{N} \frac{P(X_k|Z_k=z_j)\theta_j}{\sum_{l=1}^{N} P(X_k|Z_k=z_l)\theta_l} \quad (1)$$

$$\log\left(\frac{1}{K}\sum_{k'} \frac{P(X_{k'}|Z_{k'}=z_j)}{\sum_{l=1}^{N} P(X_{k'}|Z_{k'}=z_l)\theta_l}\right)$$

subject to $$\sum_{j=1}^{N} \theta_j = 1$$

$$A\theta = \tau^{(t)}$$

$$\forall j, 0 \leq \theta_j \leq 1$$

in step S6 Computing vector $\varphi=[\varphi_1, \ldots \varphi_N]$ as $$\varphi_j = \frac{1}{K}\sum_{k} \frac{P(X_k|Z_k=z_j)\theta_j}{\sum_{l=1}^{N} P(X_k|Z_k=z_l)\theta_l} \quad (2)$$

in step S7, updating $\tau^{(t+1)} = A\varphi$

Steps S5, S6, S7 are repeated iteratively until a stopping condition is met. At each new iteration the index (t) is increased (step S8) until a convergence is met.

In particular, step S5 involves an intermediate result that is not function of the initial target of the optimization problem. Thus, a bad choice of the intermediate result would slow the convergence of the algorithm, and thus degrades its accuracy for a limited computation time. It is proposed here not to rely on an intermediate result, but rather to convert the constraint on $\tau^{(t+1)}$ into a maximization of a hidden variable constrained $\theta$ to $A\theta = \tau^{(t)}$ which is much easier and to allow to derive closed form expressions of some parts of the optimization. This improves the convergence of the algorithm.

A random variable X of a random process Z is observed at the output of a channel characterized by the transition probability p(X|Z) as presented above with respect to step S1 of FIG. 3. The discrete set of values taken by Z is $\Omega$ and has a cardinality N=|$\Omega$|. The parameter $\tau$ is not dependent on the channel, i.e., p(X|Z, $\tau$)=p(X|Z) and p(Z, X|$\tau$)=p(X|Z)p(Z|$\tau$).

In other words: $\tau \rightarrow Z \rightarrow X$ is a Markov chain. The goal is to estimate a vector parameter t which is a linear combination of the probabilities p(Z=$z_j$|$\tau$) for all the |$\Omega$| possible values $z_j$ in the set $\Omega$.

Thus, the constraint on t is a fixed point problem:

$$\tau = f(\tau) = A[p(Z=z_1|\tau), \ldots, p(Z=z_N|\tau)]^T \quad (3)$$

where A is a I×N matrix with I being the length of $\tau$ (i.e. the assumed number of interferers I, which can correspond a priori to the number of channels i.e. I=13 in the example of FIG. 5 commented above). The j-th column of A is $z_j$ and it is assumed that I<N, which involve that A is not invertible, which constitutes the main difficulty of the problem. Thus, the variable $\tau$ should be always taken as a fixed point of the function $f(.)$, which is not necessarily unique.

The estimation of $\tau$ is optimally done by a maximization of the likelihood p(X|$\tau$)=$E_Z$[p(Z, X|$\tau$)], which is in general intractable because of the high cardinality of $\Omega$ and because X is a sequence of many observations of the channel. In order to reduce the computational complexity, an iterative algorithm can be used. At each iteration t+1, the estimation $\tau^{(t+1)}$ is improved from the knowledge of the output $\tau^{(t)}$ of the iteration t. Within one iteration, the Expectation Maximization steps are generally used, which involves Computing the probabilities p(Z=$z_j$|X, $\tau^{(t)}$) for all possible $z_j \in \Omega$, with the knowledge of $\tau^{(t)}$.

Refine the estimation $\tau^{(t+1)}$ from the set of probabilities p(Z=$z_j$|X, $\tau^{(t)}$) by using $$\tau^{(t+1)} = \arg\max_\tau E_{Z|X,\tau^{(t)}}[\log p(Z,X|\tau)] \quad (4)$$

In the present context, p(Z, X|$\tau$)=p(X|Z)p(Z|$\tau$), where p(X|Z) is known from the channel, but p(Z=$z_j$|$\tau$) cannot be uniquely known from $\tau$ since A is not invertible. Thus, several vectors [p(Z=$z_1$|$\tau$), ..., p(Z=$z_N$|$\tau$)]$^T$ satisfy the constraint (3). However, two different versions of $f(.)$ do not lead to the same result in the optimization problem (4).

In document EP-18305112, the vector [p(Z=$z_1$|$\tau$), ..., p(Z=$z_N$|$\tau$)]$^T$ was chosen according to a heuristic function, i.e., was not selected to improve (4).

Thus, in order to provide the best convergence of the algorithm, it would be of interest to optimize [p(Z=$z_1$|$\tau$), ..., p(Z=$z_N$|$\tau$)]$^T$ jointly with $\tau$ in order to get the best $\tau^{(t+1)}$ In order to make this optimization possible, it is proposed here to add another term to the optimization problem (4), which still guarantee convergence, but also drives the couple of variables $\tau$ and [p(Z=$z_1$|$\tau$), ..., p(Z=$z_N$|$\tau$)]$^T$ towards the most efficient choice of $\tau^{(t+1)}$.

Referring back to FIG. 2, the set $\Omega$ is illustrated with light grey dots D1 resulting from allocations on 16 channels. The set $\Omega$ can be converted into the interference configuration matrix A. Indeed, the set $\Omega$ is rewritten in matrix form A, in order to use linear algebra tools for solving the optimization problem. Thus, matrix A depicts in its column the combination of activation status in a same time of all interferers in a considered band. The value of each entry is 1 or 0, indicating whether there is or not interference on that channel. The cardinality of $\Omega$ is the number of columns of A. The construction of A must respect the protocol that the interferers are using (CSMA/CA for example, in the following).

$\tau_i$ is the activation rate of interference in the i-th WiFi channel, i.e. $\tau_i=E_k[Z_{i,k}]$.

The goal is to estimate the activation rate vector $\tau=[\tau_1, \ldots, \tau_I]$ from the measured observations X=$[X_1, \ldots, X_K]$.

A generic Expectation-Maximization algorithm can be implemented, and more specifically an iterative algorithm that improves the log-likelihood log P(X|$\tau$) in each iteration, called "Expectation-Maximization" and recalled in the following equations.

By introducing the latent variable Z, one obtains:

$$\log P(X|\tau) = \log P(X,Z|\tau) - \log P(Z|X,\tau^{(t)}) \quad (5)$$

By multiplying both sides by marginalizing over Z, one has:

$$\sum_z P(Z|X, \tau^{(t)}) \log P(X|\tau) = \quad (6)$$

$$\sum_z P(Z|X, \tau^{(t)}) \log P(X, Z|\tau) - \sum_z P(Z|X, \tau^{(t)}) \log P(Z|X, \tau) \Leftrightarrow$$

$$\log P(X|\tau) = Q(\tau|\tau^{(t)}) + H(\tau|\tau^{(t)})$$

where $H(\tau|\tau^{(t)})$ is the conditional entropy of the random variable $\tau$ given $\tau^{(t)}$, and $Q(\tau|\tau^{(t)})$ is the expected value of the likelihood function of $\tau$ with respect to the current conditional distribution of Z given X and the current estimates of the parameter $\tau^{(t)}$, such that:

$$Q(\tau|\tau^{(t)}) = \sum_Z P(Z|X, \tau^{(t)}) \log P(X, Z|\tau)$$

Equation (6) holds for $\tau^{(t)}$ $$\log P(X|\tau^{(t)}) = Q(\tau^{(t)}|\tau^{(t)}) + H(\tau^{(t)}|\tau^{(t)})$$

In order to maximize log P(X|$\tau$), an iterative approach, that, at each step of the algorithm, maximizes an increment ... P(X|$\tau$)–log P(X|$\tau^{(t)}$) can be implemented, leading to $$\log P(X|\tau) - \log P(X|\tau^{(t)}) = Q(\tau|\tau^{(t)}) - Q(\tau^{(t)}|\tau^{(t)}) + H(\tau|\tau^{(t)}) - H(\tau^{(t)}|\tau^{(t)}) \quad (7)$$

The Gibbs' inequality states that the information entropy is less than or equal to its cross entropy with any other distribution (i.e $H(\tau|\tau^{(t)}) \geq H(\tau^{(t)}|\tau^{(t)})$). Thus, one can write $$\log P(X|\tau) - \log P(X|\tau^{(t)}) \geq Q(\tau|\tau^{(t)}) - Q(\tau^{(t)}|\tau_{(t)}) \quad (8)$$

From (8) the Expectation-Maximization algorithm can be derived. This algorithm enhances the Log-likelihood at each iteration by ensuring that the right hand side of (8) is always positive. To do so, the Expectation is computed as $Q(\tau|\tau^{(t)})$, then the Maximization problem is solved as $\tau^{(t+1)} = \underset{\tau}{\arg\max} Q(\tau|\tau^{(t)})$. By consequence, the log-likelihood is iteratively improved.

More particularly, a special property of the problem addressed in the invention is exploited below, constituting an improvement with respect to the usual prior art on Expectation-Maximization algorithms.

As previously described, in the usual Expectation-Maximization algorithm, the step of maximization assumes that $\tau^{(t)}$ is known from the output of the previous iteration, which involves that essentially $Q(\tau|\tau^{(0)})$ should be maximized and greater than $Q(\tau^{(t)}|\tau^{(t)})$, which is fixed.

In the present approach, it is considered that $Q(\tau|\tau^{(t)})-Q(\tau^{(t)}|\tau^{(t)})$ can be expressed as a function of $\tau$, which is constrained to be a fixed point of $f(.)$. Then the problem becomes $$\underset{\tau^{(t+1)}=\tau\,|\tau=f(\tau)}{\text{argmax}}(Q(\tau|\tau^{(t)})-Q(\tau^{(t)}|\tau^{(t)})) \quad (9)$$

This is a further constraint added to the Expectation-Maximization problem which finally leads to two optimization problems which can be solved below.

The optimization under a fixed point constraint is difficult. This is solved by considering the hidden variables $\theta$ with j-th entry $\theta_j=p(Z=z_j|\tau)$ and $\tau=A\theta$; and $\theta^{(t)}$ with j-th entry $\theta_j^{(t)}=p(Z=z_j|\tau^{(t)})$ and $\tau^{(t)}=A\theta^{(t)}$. As a remark, determining $\tau$ (which is the output of the process) from $\theta$ is possible since A is a projection (rectangular matrix), but determining uniquely $\theta^{(t)}$ from $\tau^{(t)}$ is not possible. This involves that the optimization on $\tau$ can be replaced by an optimization on $\theta$, and that an additional optimization over $\theta^{(t)}$ is required but allows to express a simpler optimization algorithm than the one with the fixed point constraint.

Indeed, by using
  the mutual independence in time of the observations $X_k$ in time,
  Bayes law,
  Marginalizations over the set of possible Z,
one can get:

$$Q(\tau|\tau^{(t)}) - Q(\tau^{(t)}|\tau^{(t)}) =$$

$$\sum_k \sum_{j=1}^N \frac{P(X_k|Z_k=z_j)P(Z_k=z_j|\tau^{(t)})}{\sum_{l=1}^N P(X_k|Z_k=z_l)P(Z_k=z_l|\tau^{(t)})} \log \frac{P(Z_k=z_j|\tau)}{P(Z_k=z_j|\tau^{(t)})}$$

which, by denoting $\theta_j=p(Z=z_j|\tau)$ and $\theta_j^{(t)}=p(Z=z_j|\tau^{(t)})$, leads to an equivalent function $$D(\theta, \theta^{(t)}) = \sum_k \sum_{j=1}^N \frac{P(X_k|Z_k=z_j)\theta_j^{(t)}}{\sum_{l=1}^N P(X_k|Z_k=z_l)\theta_l^{(t)}} \log \frac{\theta_j}{\theta_j^{(t)}}$$

Thus, the optimization problem becomes $$\tau^{(t+1)}=A\times(\underset{\theta}{\text{argmax}}\,\underset{\theta^{(t)}|\tau^{(t)}=A\theta^{(t)}}{\text{max}}(D(\theta,\theta^{(t)}))) \quad (10)$$

This approach helps accelerating the convergence of log-likelihood since it maximizes the improvement in each iteration.

As a remark, in the typical Expectation-Maximization algorithm, the optimization (9) is practically made only on the $\tau$ value (the second term $Q(\tau^{(t)}|\tau^{(t)})$ playing no role in the optimization). In the approach of the invention, the second term is kept which helps in optimizing $\theta^{(t)}$, which in turn allows to find $\theta$ and then comes back to $\tau^{(t+1)}$. This is one of the advantages of the invention.

The joint optimization can be lead as follows. Firstly, it is considered a fixed $\theta^{(t)}$. The optimization $\underset{\theta}{\text{argmax}}\,D(\theta, \theta^{(t)})$ leads to the closed form solution $$\theta_j^{(t+1)} = \frac{1}{K}\sum_{k=1}^K \frac{P(X_k|Z_k=z_j)\theta_j^{(t)}}{\sum_{l=1}^N P(X_k|Z_k=z_l)\theta_l^{(t)}}$$

Substituting this into maximization problem on $\theta^{(t)}$, one can get:

$$\theta^{(t)} \leftarrow$$

$$\underset{\theta^{(t)}}{\text{argmax}} \sum_k \sum_{j=1}^N \frac{P(X_k|Z_k=z_j)\theta_j^{(t)}}{\sum_{l=1}^N P(X_k|Z_k=z_l)\theta_l^{(t)}} \log\left(\frac{1}{K}\sum_{k'=1}^K \frac{P(X_{k'}|Z_{k'}=z_j)}{\sum_{l=1}^N P(X_{k'}|Z_{k'}=z_l)\theta_l^{(t)}}\right)$$

Taking into account all constraints, the optimization problem becomes: compute $$\underset{\theta^{(t)}}{\text{argmax}} \sum_k \sum_{j=1}^N \frac{P(X_k|Z_k=z_j)\theta_j^{(t)}}{\sum_{l=1}^N P(X_k|Z_k=z_l)\theta_l^{(t)}} \log\left(\frac{1}{K}\sum_{k'=1}^K \frac{P(X_{k'}|Z_{k'}=z_j)}{\sum_{l=1}^N P(X_{k'}|Z_{k'}=z_l)\theta_l^{(t)}}\right)$$

subject to $$\sum_{j=1}^N \theta_j^{(t)} = 1$$

$$A\theta^{(t)} = \tau^{(t)}$$

$$\forall j,\ 0 \le \theta_j^{(t)} \le 1$$

This optimization problem as defined in these latest equations can be solved by any numerical optimization toolbox. Alternatively, the optimization problem can be solved by generating at random several values of $\theta^{(t)}$, selecting the ones satisfying (or being close to satisfying) the constraints $$\sum_{j=1}^N \theta_j^{(t)} = 1,\ A\theta^{(t)} = \tau^{(t)},$$

and $\forall j$, $0 \le \theta_j^{(t)} \le 1$, and computing the value $$\sum_k \sum_{j=1}^N \frac{P(X_k|Z_k=z_j)\theta_j^{(t)}}{\sum_{l=1}^N P(X_k|Z_k=z_l)\theta_l^{(t)}} \log\left(\frac{1}{K}\sum_{k'=1}^K \frac{P(X_{k'}|Z_{k'}=z_j)}{\sum_{l=1}^N P(X_{k'}|Z_{k'}=z_l)\theta_l^{(t)}}\right),$$

and keeping the random choice of $\theta^{(t)}$ providing the highest value.

The criterion of "being close to satisfying" the constraints can, for example, correspond to applying a threshold to the constraint, such that $$\left|\sum_{j=1}^N \theta_j^{(t)} - 1\right| < \varepsilon,\ \varepsilon < \theta_j^{(t)} < 1-\varepsilon,\ |A\theta^{(t)} - \tau^{(t)}| < \varepsilon.$$

Then, from the optimized $\theta^{(t)}$, one can deduce $\theta^{(t+1)}$ by using $$\theta_j^{(t+1)} = \frac{1}{K}\sum_{k=1}^K \frac{P(X_k|Z_k=z_j)\theta_j^{(t)}}{\sum_{l=1}^N P(X_k|Z_k=z_l)\theta_l^{(t)}},$$

which allows to get $\tau^{(t+1)}=A\theta^{(t+1)}$

The convergence is faster than in document EP-18305112 and the result is more accurate.

Figure 4:
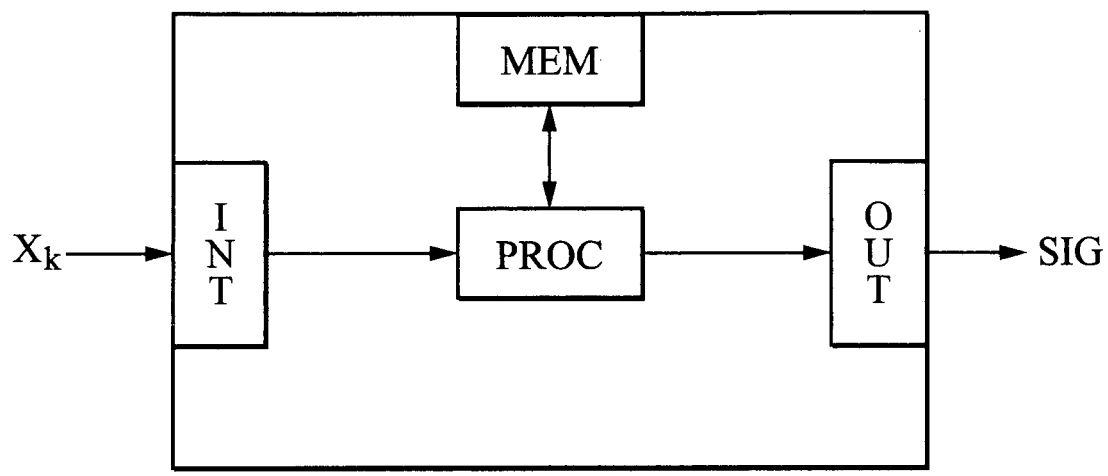
FIG. 4 shows schematically an example of a processing circuit of a device according to the invention.

Of course, all the algorithms represented by flow the chart of FIG. 3 are performed in practice by a computer running an appropriate computer program having an algorithm corresponding to one of those represented in FIG. 3. Such a computer comprises as shown in FIG. 4:
- An input interface INP to receive measurements $X_k$,
- A memory MEM for storing at least the instructions of the aforesaid computer program,
- A processor PROC for reading the instructions and running then the corresponding program, and
- An output interface OUT for delivering a signal SIG including at least data related to activation rates of transmission bands by interferers, and possibly recommended channels identifiers to avoid these interferers.

The invention claimed is:

1. A method implemented by computer means for estimating interference on a radiofrequency system using a set of channels, said interference being caused by interferers of an interfering system using a set of I transmission bands, each of said transmission bands extending on a plurality of contiguous channels of said set of channels, wherein the method comprises:
   Determining a set $\Omega$ of all N possible configurations of occupation or non-occupation of said set of transmission bands, defined as a set of possible vectors $Z_k = [Z_{1,k}, \ldots Z_{i,k}, \ldots Z_{I,k}]$,
   Building a matrix A from a stacking of all the possible vectors $Z_k$,
   Obtaining measurements $X_1, \ldots, X_k, \ldots, X_K$ of occupation of at least a part of said set of channels, at respective time instants k: $0 < k \leq K$, where K defines a given observation time window,
   Computing probabilities defined as: $\forall k, \forall z_j \in \Omega$, $P(X_k|Z_k = z_j)$, where P(X|Z) defines a channel transition function, so as to determine, for each transmission band, an estimated activation rate $\tau$, on the basis of said measurements $X_1, \ldots, X_k, \ldots, X_K$, said estimated activation rate $\tau$ corresponding to an occupation rate of a transmission band i by an interferer within said given observation time window,
And wherein said probabilities computations iteratively comprise, at each iteration t:
   resolving a non-linear optimization problem with a constraint defined so as to:
   maximize $$\sum_k \sum_{j=1}^{N} \frac{P(X_k | Z_k = z_j)\theta_j}{\sum_{l=1}^{N} P(X_k | Z_k = z_l)\theta_l} \log\left( \frac{1}{K} \sum_{k'} \frac{P(X_{k'}|Z_{k'} = z_j)}{\sum_{l=1}^{N} P(X_{k'}|Z_{k'} = z_l)\theta_l} \right) \quad (1)$$

subject to $$\sum_{j=1}^{N} \theta_j = 1$$

$$A\theta = \tau^{(t)}$$

$$\forall j, 0 \leq \theta_j \leq 1$$

where vector $\tau^{(t)}$ is a column of activation rates in respective transmission bands i estimated at an iteration index t, and vector $\theta$ is a hidden variable, computing a vector $\varphi = [\varphi_1, \ldots, \varphi_N]$ as a hidden variable as:

$$\varphi_j = \frac{1}{K} \sum_k \frac{P(X_k | Z_k = z_j)\theta_j}{\sum_{l=1}^{N} P(X_k | Z_k = z_l)\theta_l} \quad (2)$$

and updating the vector of the activation rates for a next iteration index t+1, as $$\tau^{(t+1)} = A\varphi.$$

2. The method according to claim 1, wherein said set $\Omega$ of possible vectors $Z_k = [Z_{1,k}, \ldots, Z_{i,k}, \ldots Z_{I,k}]$ satisfy at a time instant k a non-overlapping condition of said radiofrequency system, said non-overlapping condition corresponding to the fact that only one interferer i, among a set of I possible interferers, can be active at a same time k on each channel of said set of channels and forming, with contiguous channels, a transmission band i.

3. The method according to claim 2, wherein said non-overlapping condition derives from a CSMA/CA multiple access implementation performed by said radiofrequency system, said CSMA/CA multiple access defining communication timeslots, and said measurements $X_k$ being collected at each timeslot k.

4. The method according to claim 1, wherein said set $\Omega$ of possible vectors comprises $2^I$ elements.

5. The method according to claim 1, wherein said communicating system implements a frequency hopping on said channels, and said obtaining measurements $X_1, \ldots, X_k, \ldots, X_K$ is performed according to a frequency hopping implementation.

6. The method according to claim 1, wherein a number of said contiguous channels forming a transmission band is four, a total number of channels of said set of channels being sixteen.

7. The method according to claim 6, wherein each of said channels extends over 5 MHz, whereas each of said transmission bands extends over 20 MHz with a spread spectrum technology implementation.

8. The method according to claim 1, wherein said radiofrequency system implements an ISM type communication, while the interfering system implements a Wifi type communication.

9. The method according to claim 1, comprising further a selection for communication of at least one channel among said set of channels, said selected channel being within a transmission band for which said estimated activation rate c is the lowest.

10. A non-transitory computer readable medium storing a computer program comprising instructions for performing the method according to claim 1, when these instructions are run by a processor.

11. Device for estimating interference on a radiofrequency system using a set of channels, said interference being caused by interferers of an interfering system using a set of transmission bands, each of said transmission bands extending on a plurality of contiguous channels of said set of channels, said device comprising a processing circuit for performing the method according to claim 1.

12. A radiofrequency communication system, comprising a device according to claim 11 for estimating interference susceptible to occur on channels to be used by the radiofrequency communication system.

* * * * *